United States Patent [19]

Brown

[11] 3,751,141

[45] Aug. 7, 1973

[54] REMOTE ELECTRICALLY CONTROLLED TWO-WAY MIRROR

[75] Inventor: J. Murray Brown, Huntington, Mich.

[73] Assignee: Electronics Enterprises, Inc., Detroit, Mich.

[22] Filed: Oct. 27, 1971

[21] Appl. No.: 192,829

[52] U.S. Cl. .............................. 350/289, 74/501 M
[51] Int. Cl. ........................................... G02b 5/08
[58] Field of Search................... 350/289, 307, 303, 350/304; 74/501 M, 89.15, 89.17

[56] References Cited
UNITED STATES PATENTS
3,634,002  1/1972  Vollrath.............................. 350/289
3,609,014  9/1971  Kurz, Jr. ............................ 350/289

Primary Examiner—David Schonberg
Assistant Examiner—Michael J. Tokar
Attorney—Charles R. Rutherford

[57] ABSTRACT

The mirror assembly includes support structure for mounting on a vehicle. The support structure includes means for pivotally mounting a mirror thereon. Actuating mechanism driven by a reversible electric motor is provided for changing the angular adjustment of the mirror. The actuating mechanism is mounted within a sealed housing. A screw is provided within the housing connected to the output of the motor. The screw engages and drives a nut. The nut is cammingly connected to a lever to cause swinging of the lever upon movement of the nut. The lever is, in turn, connected to the mirror for pivoting the mirror for adjustment purposes.

11 Claims, 3 Drawing Figures

PATENTED AUG 7 1973 3,751,141

REMOTE ELECTRICALLY CONTROLLED TWO-WAY MIRROR

BACKGROUND OF THE INVENTION

1. Field of the Invention

The type of mirror assemblies to which the present invention relates are those commonly used on large vehicles, such as trucks, buses, and automobiles which pull trailers. Normally, one such mirror is provided on each side of the driver's compartment so that the driver will have a field of vision along both sides of the unit behind the driving compartment. The mirror is located a considerable distance outwardly from the sides. It is difficult for the driver to manually adjust the mirrors as needed. Consequently, a need has been expressed for remotely controlled adjusting means including switch means easily accessible to the driver for making adjustments to the mirrors while he is within the vehicle.

The present invention provides such a mirror assembly which has a number of advantages. Firstly, the mirror assembly includes an actuating mechanism all of the components of which are mounted within a single sealed housing. The components are not subjected to ambient weather conditions which would cause rusting, corrosion and dirt to collect and interfere with operation of the mechanism. A simplified nut, screw and lever mechanism is provided within the housing for connection between a reversible electric motor and the mirror for pivoting of the mirror to adjusted positions.

2. Description of the Prior Art

This invention relates to remote electrically controlled two-way mirrors. Mirrors of this general type are disclosed in the prior U.S. Pat. of S. S. Law, No. 1,622,157, issued Mar. 22, 1927; E. O. Park, No. 2,330,444, issued Sept. 28, 1943; R. N. Falge, No. 2,623,986, issued Dec. 30, 1952; A. Nihon, No. 2,625,218, issued Jan. 13, 1953; F. L. O. Roehrig, No. 2,664,785, issued Jan. 5, 1954; C. M. Bolser, No. 2,860,546, issued Nov. 18, 1958; T. J. Ochello et al., No. 2,944,277, issued July 12, 1960; A. R. Baird et al., No. 3,005,384, issued Oct. 24, 1961; C. A. White, No. 3,075,431, issued Jan. 29, 1963; P. Bertell et al., No. 3,132,201, issued May 5, 1964; W. M. Booth, No. 3,277,678, issued Oct. 11, 1966; J. Werner, No. 3,392,488, issued July 16, 1968; J. J. Peters, No. 3,429,639, issued Feb. 25, 1969; A. W. Kurz, Jr., No. 3,492,065, issued Jan. 27, 1970; and A. W. Kurz, Jr., No. 3,537,778, issued Nov. 3, 1970.

SUMMARY OF THE INVENTION

The rear view mirror assembly is provided for mounting on the side of a vehicle. It comprises a support structure securable to a vehicle. Spaced apart mirror holding members are carried on the support structure. A mirror is mounted between the mirror holding members. Pivotal means pivotally connect the mirror at two spaced apart locations to the mirror holding members and thereby define a pivot axis for adjustment of the mirror with respect to a vehicle. One of the mirror holding members includes an actuating mechanism for powered mirrored adjustment from a remote location. The actuating mechanism comprises a housing including separable portions. Fastening means sealingly connect the separable portions together. A reversible electric motor is mounted within said housing. An elongated screw is connected to the output of said motor. Spaced apart wall structure is provided in said housing to define a guideway. A nut is slidably received in the guideway. The screw extends into the guideway into threading engagement with the nut to drive the nut to and fro upon energization of the motor. The nut has a slot in one face thereof. The slot is oriented generally transversely with respect to the guideway. A lever is fixedly connected at one end to the mirror. A cam element is provided on the other end of the lever. The cam element is slidably received in the slot of the nut. To and fro movement of the nut results in camming the camming element along the slot to cause swinging of the lever for adjustment of the mirror.

IN THE DRAWING

Figure 1:
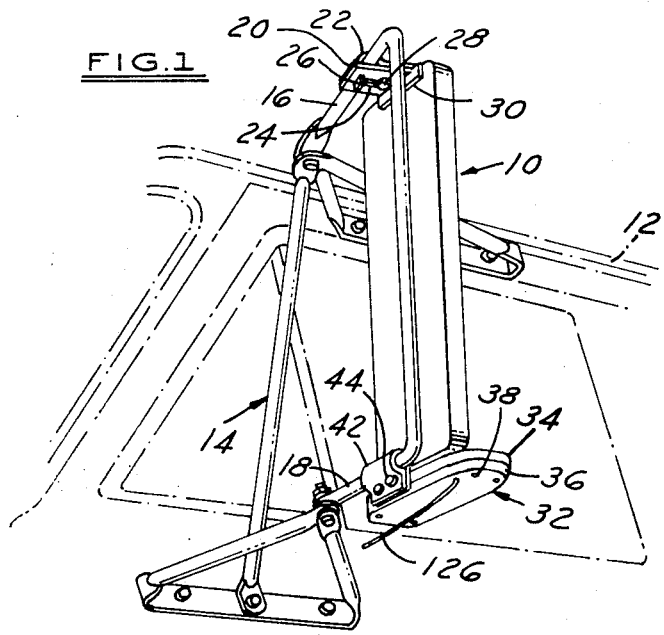
FIG. 1 is a view in perspective of one embodiment of the remote electrically controlled two-way mirror of the present invention illustratively mounted on a vehicle.

Referring to the drawing, the mirror 10 is of the type mounted on a large vehicle such as a bus or truck 12. The mirror 10 includes a frame and the usual reflecting glass. The mirror is generally rectangular in shape and is elongated in the vertical direction to present a large field of view. The mirror 10 is pivotally mounted on a support structure 14 which is attached to the side of the vehicle 12. The support structure 14 includes tubular support members 16, 18 which extend outwardly from the vehicle to position the mirror 10 the desired distance away from the vehicle as is conventional.

The upper end of the mirror 10 is pivotally mounted to the tubular support member 16 by means of a bracket structure which includes a generally horizontally extending plate 20 which extends beneath the support member 16 and a loop strap portion 22 which extends around the member 16. An elongated slot 24 is provided in the plate 20 to receive the notched end 26 of the strap 22 and a nut and bolt structure 28. The slot 24 permits a degree of horizontal adjustment of the plate 20 with respect to the support member 16 to properly position the mirror 10. The bracket structure is pivotally secured to a U-shaped member 30 secured to the top of the mirror 10.

The lower end of the mirror 10 is supported by an actuating mechanism 32. The actuating mechanism 32 includes a housing comprising operable upper and lower members 34, 36 which are secured together by means of screws 38. A gasket 40 is provided between the members 34, 36 to seal the interior of the housing from the ambient atmosphere. A strap-type bracket 42 engages the lower tubular support member 18 and is secured to the lower housing member by means of screws 44.

Power mechanism is provided within the housing to cause desired pivoting of the mirror 10 about a vertical axis. The power mechanism includes a reversible electric motor 46 having a speed-reducing gear box 48 connected to the output shaft thereof, the motor and gear box being enclosed in an integral sealed housing. The lower housing portion 36 has a transverse wall 50 which defines a compartment 52 for the motor and gear box assembly. This assembly is secured to the wall 50 by means of screws 54. An embossment 56 having a central opening therethrough is provided on the opposite face of the wall 50. The output shaft 58 of the gear box extends through said opening. The shaft 58 is flat for reception in the bifurcated end 83 of a screw 82.

A pair of oppositely disposed walls 60, 62 are provided in housing portion 36. The walls 60, 62 define a guideway 64 which is in alignment with the output shaft 58. Transverse wall portions 66, 68 extend from the ends of walls 60, 62 to the sides of the housing lower portion 36 to provide structural rigidity.

An elongated nut 70 is slidably received in the guideway 64. The lower portion 71 of the nut 70 is generally square in cross section to thereby fit snugly between the walls 60, 62 for accurate guidance thereby. The upper portion 72 of the nut 70 has inwardly angled side surfaces and a flat top surface. A transverse slot 80 extends across the nut through the upper portion 72.

Figure 2:
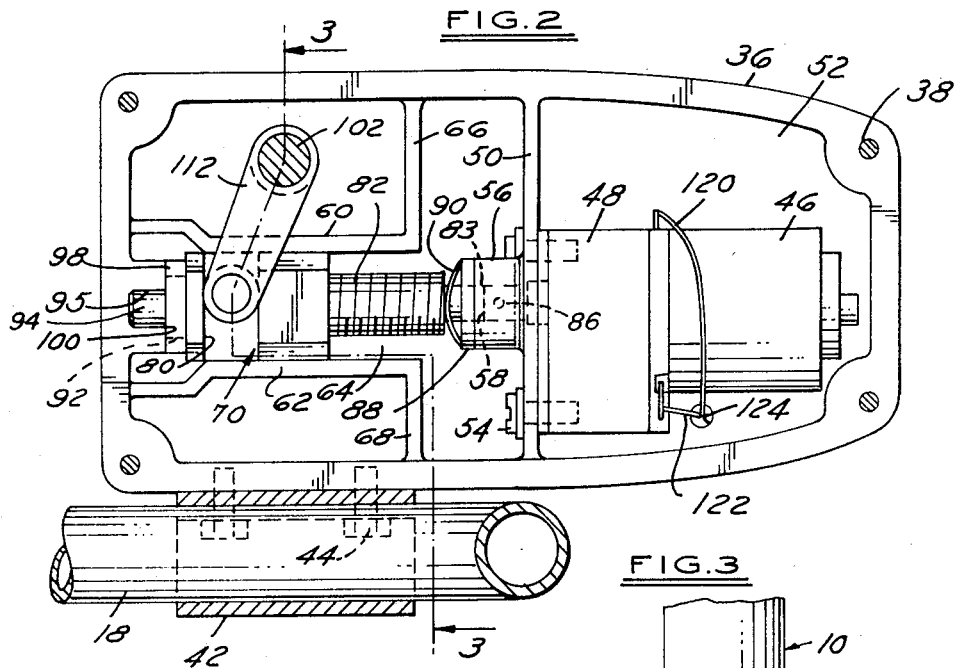
FIG. 2 is a top plan view of the actuating mechanism with the upper portion of the housing removed for the purpose of clarity.
Figure 3:
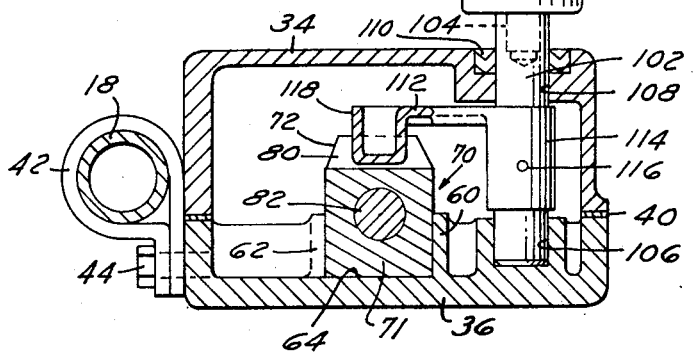
FIG. 3 is a sectional view taken substantially along the line 3—3 of FIG. 2 looking in the direction of the arrows.

The nut is driven to and fro in the guideway 64 by means of a driving screw 82. The screw 82 has a central threaded portion which is threadingly received in the nut 70. One end 83 of the screw 82 is of reduced diameter and, as previously mentioned, bifurcated. The end extends through the opening in embossment 56 into engagement with the output shaft 58 of the gear box 48 to thereby be driven upon actuation of the motor 46. A thrust washer 88 and bowed "E" ring 90 are interposed between the end of the threaded portion 84 and the surface of theembossment 56 to urge the screw 82 (which is capable of a degree of longitudinal movement) to the left as viewed in FIG. 2 into pressure engagement with the nut 70. A set screw 86 fastens the shaft 58 and the screw 82 together after this initial pressure has been applied.

The other end of the screw includes step-down portions 92, 94 of reduced diameter. The portion 94 is rotatably received in a socket 95 in the end of the housing to thereby journal the screw for rotation when driven by the motor. A stop ring 98 is received on portion 92. The stop ring, which is preferably fabricated of a plastic material, prevents the nut 70 from frictionally engaging the surface 100 of the housing when the nut is driven to the extreme left as viewed in FIG. 2. This prevents jam-up of the actuating mechanism.

A lever 112 is operably connected between the nut 70 and a shaft 102. The shaft 102 is connected to the lower edge of the mirror 10 by means of a threaded stud 104 which is threadingly received in a threaded opening provided in the upper end of the shaft 102. The lower end of shaft 102 is rotatably received in a socket 106. The upper portion of the shaft 102 extends through an opening 108 provided in upper housing portion 34. A sealing ring 110 is received in a cylindrical notch provided in the upper housing portion. The sealing ring 110, which may be fabricated of rawhide, surrounds the shaft 102 to thereby seal the interior of the housing from the ambient atmosphere.

The lever 112 has a sleeve 114 at one end thereof. The shaft 102 extends through the sleeve 114. The shaft and sleeve are secured together for rotation by means of a set screw 116.

The lever has a downwardly depending cylindrical cam element 118 at the other end. The cam element 118 is received in the slot 80 of the nut 70. To and fro movement of the nut 70 causes the cam element 118 to move transversely of the nut thereby imparting a swinging movement to the lever 112. This swinging movement results in pivoting of the mirror 10 for adjusting purposes.

Leads 120, 122 extend from the motor 46 through a sealed opening 124 in lower housing portion 36. The leads are formed into a sheathed cable 126 which extends from the actuator 32 to the vehicle 12 and thence through an opening therein into the interior cab compartment. A double throw switch (not shown) is provided interiorly of the cab. The driver has merely to throw the switch one way or the other to cause proper rotation of the motor 46 and screw 82 to result in swinging of the lever 112 and pivoting of the mirror 10 in the desired direction for suitable adjustment thereof.

Desirably, the driving screw 82 and nut 70 are fabricated of a slippery plastic material to avoid the need for lubrication. The housing components are preferably of die cast aluminum or magnesium for corrosion resistance. The motor 46 may be a 24 or 12 volt D.C. structure and is preferably housed in a sealed casing.

What I claim as my invention is:

1. A rear view mirror assembly for mounting on the side of a vehicle comprising a support structure securable to a vehicle, spaced apart mirror holding members carried on said support structure, a mirror, pivotal means pivotally connecting said mirror at two spaced apart locations to the mirror holding members, said pivotal means defining a pivot axis for adjustment of the mirror with respect to a vehicle, one of said mirror holding members including an actuating mechanism for powered mirror adjustment from a remote location, said actuating mechanism comprising a housing including separable portions, means securing said separable portions together in sealed condition, a reversible electric motor mounted within said housing, an elongated screw connected to the output of said motor, spaced apart wall structure in said housing defining a guideway, a nut slidably received in said guideway, said screw extending into said guideway into threading engagement with said nut to drive said nut to and fro upon energization of said motor, said nut having a single slot in one face thereof, said slot being oriented generally transversely with respect to said guideway, a single lever, said lever being fixedly connected at one end to said mirror, a single cam element on the other end of said lever, said cam element being slidably received in the slot in the nut whereby to and fro movement of said nut results in displacing said cam element in said slot to cause swinging of the lever for adjustment of the mirror.

2. A mirror assembly as defined in claim 1, further characterized in that said screw terminates at the outer end in a non-threaded portion, said housing including a wall having a socket rotatably receiving said non-threaded portion, a ring-like stop element received on said screw adjacent said outer end to thereby be interposed between said wall and said nut, said ring-like stop element serving to prevent said nut from jamming against said wall.

3. A mirror assembly as defined in claim 1, further characterized in that said screw is detachably connected to the output of said motor to permit a degree of longitudinal movement of the screw prior to being connected, spring means interposed between the screw and the output of said motor urging said screw away from said motor to apply pressure against said nut prior to connection of the screw to the output of said motor.

4. A mirror assembly as defined in claim 1, further characterized in that said cam element is cylindrical.

5. A mirror assembly as defined in claim 1, further characterized in that said lever has a sleeve at said one end, a shaft extending through said sleeve and connected to said mirror, and means fixedly connecting said sleeve to said shaft.

6. A remote control rear view mirror assembly mountable on the side of a vehicle and comprising a mirror supporting structure including relatively spaced mirror supporting members, a mirror member including pivotal means connecting said mirror member to said supporting members for adjustment about a pivotal axis and with respect to the vehicle, and a housing member on one of said mirror supporting members having an electrically operative mechanism provided therewithin and operatively connected to one of said pivotal means for remote controlled adjustment actuation of said mirror member, said housing member including parts sealable against inclement weather and providing an enclosure having receptive spaces for components of said electrically operative mechanism to be housed and supported therewithin, one of said components including a reversible electric motor having a screw threaded shaft operatively connected thereto and a travel nut member threadably engaged with said shaft, means within said housing precluding the relative turning of said travel nut on said shaft and for guiding the translational movement of said travel nut longitudinally of said shaft, and follower means engaged with said travel nut and including a crank arm engaged to and operative of said one pivotal means.

7. The mirror assembly of claim 6, said shaft and travel nut including ball screw threads for a relatively greater ratio of translational to rotational movement therebetween, and said travel nut having a transverse slot therewithin receptive of said follower means and permissive of relative movement therebetween.

8. The mirror assembly of claim 6, said guiding means within said housing including structural walls formed within one of said housing parts and extending in parallel spaced relation longitudinally of said shaft throughout a substantial length thereof.

9. The mirror assembly of claim 8, said travel nut being of a relative width and having sidewalls formed to conform to be received between and guided on the structural walls of said one housing part for translational movement substantially exclusively, and said nut having a transverse slot therewithin receptive of said follower means and permissive of longitudinal movement substantially exclusively therewith.

10. The mirror assembly of claim 7, said crank arm being formed to extend relatively over said travel nut, said follower means including a cam element provided on said crank arm and relatively fitted to said slot for precluding relative lateral movement therebetween, and a pivot pin post mounted in said housing parts and having said crank arm engaged thereto with one end of said post exposed through an enclosing wall and formed for fixed engagement to said one pivotal means.

11. The mirror assembly of claim 10, said housing parts being formed to accommodate said pivot pin post on both sides of said screw threaded shaft and for optional selection of one thereof in providing either a right or left hand rear view mirror operating mechanism.

* * * * *